(12) United States Patent
Dorsey et al.

(10) Patent No.: US 12,175,084 B2
(45) Date of Patent: Dec. 24, 2024

(54) MANAGING INPUT/OUTPUT (I/O) OPERATIONS AT A STORAGE DEVICE BASED ON RESOURCE CAPABILITY OF THE STORAGE DEVICE

(71) Applicant: Dell Products L.P., Round Rock, TX (US)

(72) Inventors: Kurtis Wayne Dorsey, New Braunfels, TX (US); James Brandon Graham, III, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 18/149,195

(22) Filed: Jan. 3, 2023

(65) Prior Publication Data
US 2024/0220124 A1 Jul. 4, 2024

(51) Int. Cl.
*G06F 3/06* (2006.01)

(52) U.S. Cl.
CPC .......... *G06F 3/0613* (2013.01); *G06F 3/0653* (2013.01); *G06F 3/0673* (2013.01)

(58) Field of Classification Search
CPC ..... G06F 3/0613; G06F 3/0653; G06F 3/0673
USPC .......................................................... 710/74
See application file for complete search history.

(56) References Cited

U.S. PATENT DOCUMENTS

| | | | | |
|---|---|---|---|---|
| 6,947,445 B1 * | 9/2005 | Barnhart | ............... | H04L 47/781 370/468 |
| 8,218,538 B1 * | 7/2012 | Chidambaram | .... | H04L 49/9094 370/386 |
| 11,734,110 B1 * | 8/2023 | Rijo | ..................... | G06F 11/1068 714/764 |
| 2002/0194251 A1 * | 12/2002 | Richter | ................. | G06F 9/5011 718/104 |
| 2003/0046396 A1 * | 3/2003 | Richter | ............... | G06F 11/3433 709/226 |
| 2006/0233108 A1 * | 10/2006 | Krishnan | .............. | H04J 3/1682 370/235 |
| 2010/0076805 A1 * | 3/2010 | Batsakis | ............. | H04L 67/1097 705/26.1 |
| 2015/0106575 A1 * | 4/2015 | Matsumoto | ............... | G06T 1/60 711/154 |
| 2016/0092272 A1 * | 3/2016 | Karaje | ................ | G06F 13/1642 718/104 |

(Continued)

*Primary Examiner* — Titus Wong
(74) *Attorney, Agent, or Firm* — McDermott Will & Emery LLP

(57) ABSTRACT

Managing input/output (I/O) operations at a storage device, including receiving, at storage device, a first set of input/output (I/O) operations at a first throughput; processing, at the storage device, the first set of I/O operations; determining, in response to processing the first set of I/O operations, that a resource capability of the storage device is below a threshold; setting, in response to determining that the resource capability of the storage device is below the threshold, a congestion bit associated with the storage device to a first value; receiving, at the storage device, a second set of I/O operations at a second throughput based on the first value of the congestion bit; determining that the second throughput of the second set of I/O operations is less than the first throughput of the first set of I/O operations, and in response, processing, at the storage device, the second set of I/O operations.

18 Claims, 4 Drawing Sheets

(56) References Cited

U.S. PATENT DOCUMENTS

2016/0162425 A1\* 6/2016 Accapadi .............. G06F 13/364
                                                      710/111
2019/0068503 A1\* 2/2019 Wei ........................ H04L 47/11
2023/0067749 A1\* 3/2023 Srinivasan ............ G06F 3/0655

\* cited by examiner

FIG. 4

MANAGING INPUT/OUTPUT (I/O) OPERATIONS AT A STORAGE DEVICE BASED ON RESOURCE CAPABILITY OF THE STORAGE DEVICE

BACKGROUND

Field of the Disclosure

The disclosure relates generally to managing input/output (I/O) operations at a storage device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing input/output (I/O) operations at a storage device, the method including receiving, at storage device, a first set of input/output (I/O) operations at a first throughput; processing, at the storage device, the first set of I/O operations; determining, in response to processing the first set of I/O operations, that a resource capability of the storage device is below a threshold; setting, in response to determining that the resource capability of the storage device is below the threshold, a congestion bit associated with the storage device to a first value; receiving, at the storage device, a second set of I/O operations at a second throughput based on the first value of the congestion bit; and determining that the second throughput of the second set of I/O operations is less than the first throughput of the first set of I/O operations, and in response, processing, at the storage device, the second set of I/O operations.

Other embodiments of these aspects include corresponding systems, apparatus, and computer programs, configured to perform the actions of the methods, encoded on computer storage devices.

These and other embodiments may each optionally include one or more of the following features. For instance, determining, in response to processing the second set of I/O operations, that the resource capability of the storage device is above the threshold; and setting, in response to determining that the resource capability of the storage device is above the threshold, the congestion bit associated with the storage device to a second value. Receiving, from the initiator computing module, a third set of I/O operations at the first throughput based on the second value of the congestion bit; and processing, at the storage device, the third set of I/O operations. The first value of the congestion bit indicates the congestion bit is set, and the second value of the congestion bit indicates the congestion bit is unset. Determining, in response to processing the second set of I/O operations, that the resource capability of the storage device is below the threshold; and processing, in response to determining that the resource capability of the storage device is below the threshold, the second set of I/O operations. Determining that the second throughput of the second set of I/O operations is substantially the same as the first throughput of the first set of I/O operations, and in response, updating a state of the storage device to a busy state; in response to the busy state of the storage device: ceasing to receive additional I/O operations from the initiator computing module; and continue processing the second set of I/O operations. Determining, in response to processing the second set of I/O operations, that the resource capability of the storage device is above the threshold; in response to determining that the resource capability of the storage device is above the threshold: setting the congestion bit associated with the storage device to a second value; updating the state of the storage device from the busy state to an open state; and receiving, from the initiator computing module, a third set of I/O operations at the first throughput based on the second value of the congestion bit and the open state of the storage device. Determining, in response to processing the first set of I/O operations, that the resource capability of the storage device is below the threshold; in response to determining that the resource capability of the storage device is above the threshold: continue processing the second set of I/O operations. Determining, in response to processing the first set of I/O operations, that a resource capability of the storage device is above a threshold; and continue processing, in response to determining that the resource capability of the storage device is above the threshold, the first set of I/O operations.

Particular implementations of the subject matter described in this specification can be implemented so as to realize one or more of the following advantages. For example, system performance is increased and data latency is decreased.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 illustrates a frame format.

DESCRIPTION OF PARTICULAR EMBODIMENT(S)

Figure 1:
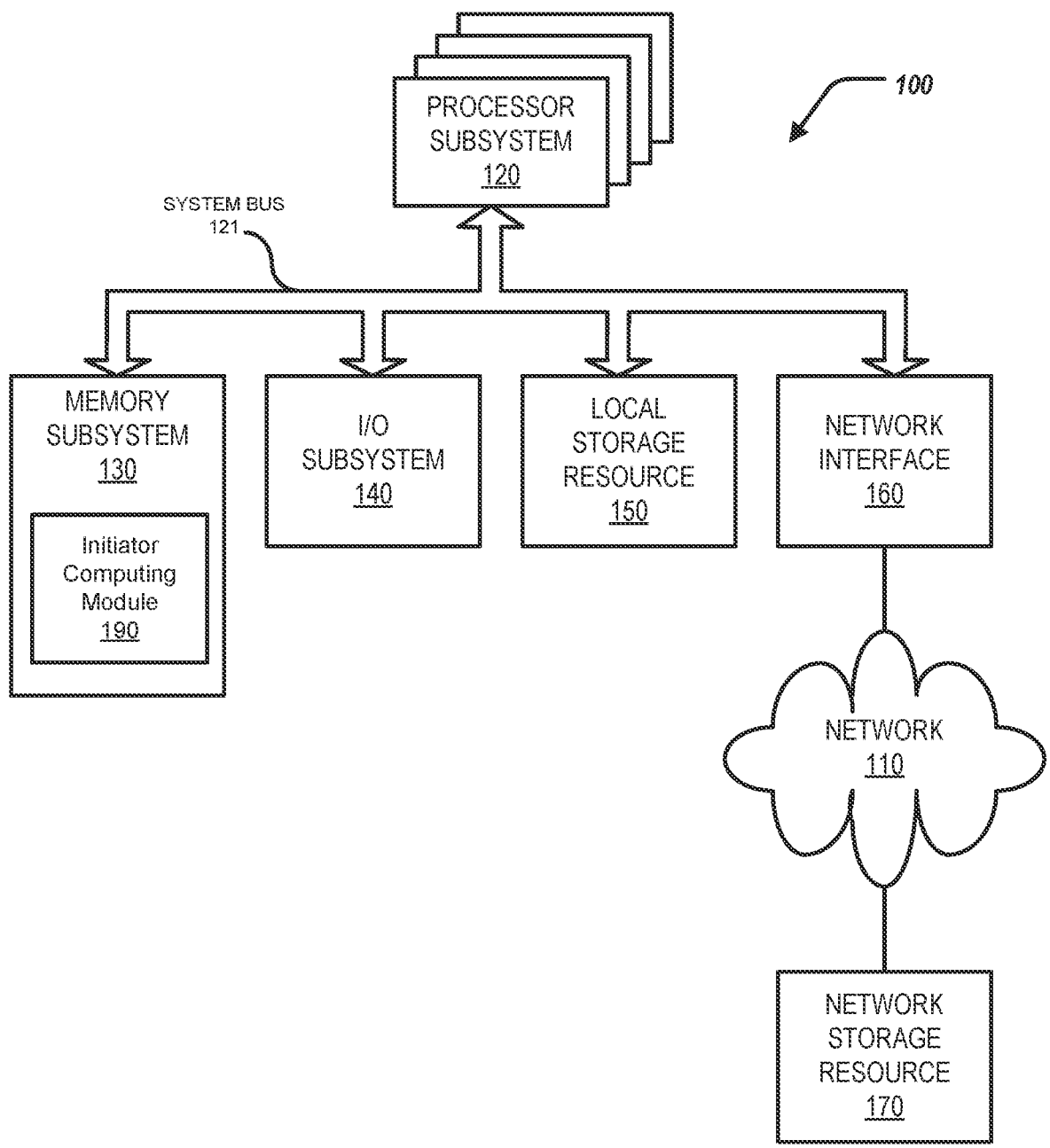
FIG. 1 is a block diagram of selected elements of an embodiment of an information handling system.

This disclosure discusses methods and systems for managing input/output (I/O) operations at a storage device. In short, a small computer system interface (SCSI) target can communicate its congestion status to a SCSI initiator via a congestion bit. When the SCSI initiator supports recognition of the congestion bit, the SCSI initiator can adjust a throughput of I/O operations sent to the SCSI target.

Specifically, this disclosure discusses a system and a method for receiving, at storage device, a first set of input/output (I/O) operations at a first throughput; processing, at the storage device, the first set of I/O operations; determining, in response to processing the first set of I/O operations, that a resource capability of the storage device is below a threshold; setting, in response to determining that the resource capability of the storage device is below the threshold, a congestion bit associated with the storage device to a first value; receiving, at the storage device, a second set of I/O operations at a second throughput based on the first value of the congestion bit; and determining that the second throughput of the second set of I/O operations is less than the first throughput of the first set of I/O operations, and in response, processing, at the storage device, the second set of I/O operations.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

Ins particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an initiator computing module 190. The initiator computing module 190 can be included by the memory subsystem 130. The initiator computing module 190 can include a computer-executable program (software). The initiator computing module 190 can be executed by the processor subsystem 120.

In short, a small computer system interface (SCSI) target can communicate its congestion status to a SCSI initiator via a congestion bit. When the SCSI initiator supports recognition of the congestion bit, the SCSI initiator can adjust a throughput of I/O operations sent to the SCSI target.

Figure 2:
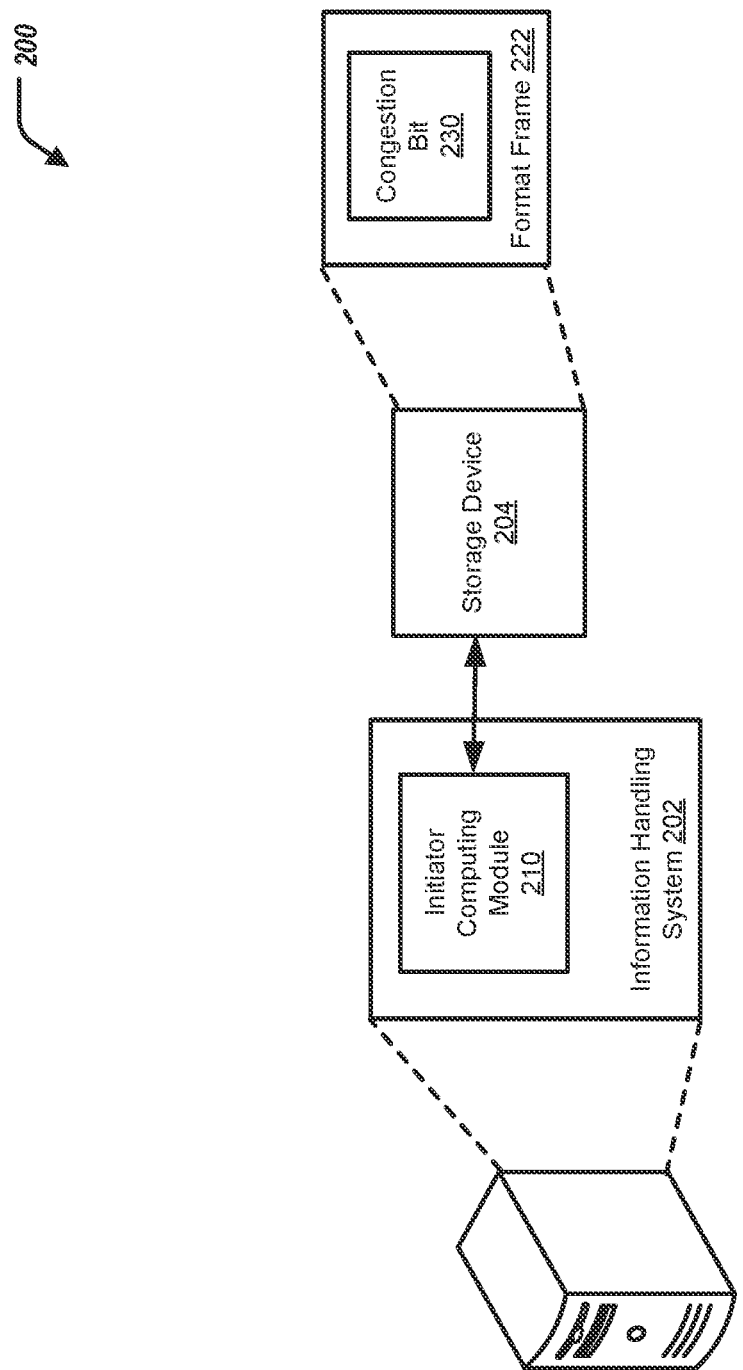
FIG. 2 illustrates a block diagram of a computing environment for managing input/output (I/O) operations at a storage device.

Turning to FIG. 2, FIG. 2 illustrates an environment 200 including an information handling system 202 and a storage device 204. The information handling system 202 can include an initiator computing module 210. In some examples, the information handling system 202 includes the storage device 204. In some examples, the information handling system 202 is similar to, or includes, the information handling system 100 of FIG. 1. In some examples, the initiator computing module 210 is the same, or substantially the same, as the initiator computing module 190 of FIG. 1.

The information handling system 202, and specifically, the initiator computing module 210, can be in communication with the storage device 204.

In some examples, the storage device 204 is a small computer system interface (SCSI) computing device. For example, the storage device 204 can be a hard disk drive (HDD) or a solid state drive (SSD). The storage device 204 can be any type of storage device. In some examples, the storage device 204 can represent any type of device that is implemented via a SCSI interface.

The storage device 204 can be associated with a frame page, and in particular, a serial SCSI protocol (SSP) Frame Format 222. The SSP Frame Format 222 can store data representing a congestion status (or con status) of the storage device 204 represented as a congestion bit 230, described further herein. For example, the SSP Frame Format 222 can store data representing the congestion status of the storage device 204 as the congestion bit 230 at byte 8.

In some examples, the storage device 204 can include one or more processing modules, similar to the processor subsystem 120 of FIG. 1, for performing one or more processing operations related to storage of, retrieval of, reception of, and access to data.

Figure 3:
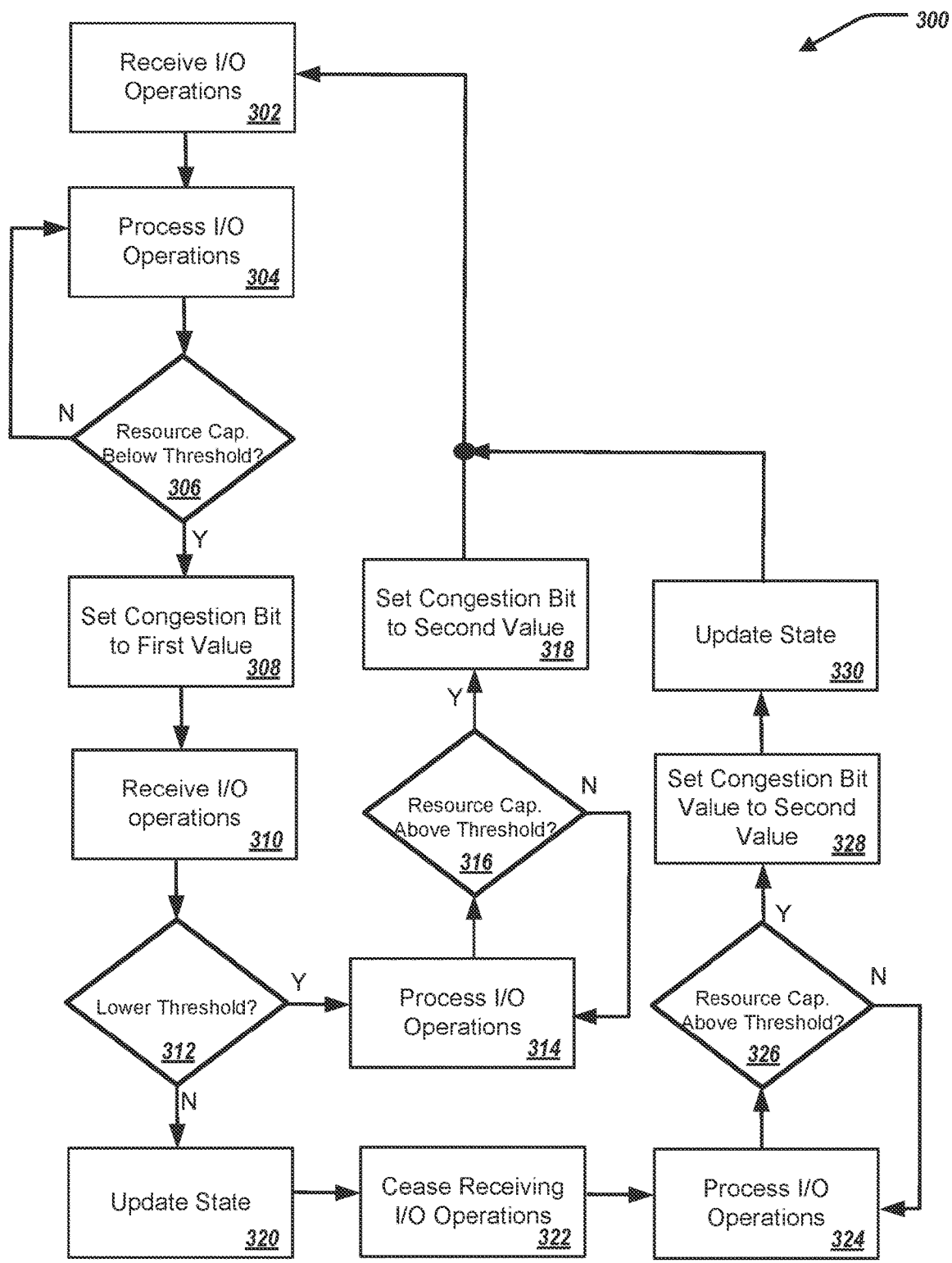
FIG. 3 illustrates a method for managing input/output (I/O) operations at a storage device.

FIG. 3 illustrates a flowchart depicting selected elements of an embodiment of a method 300 for managing input/output (I/O) operations at the storage device 204. The method 300 may be performed by the information handling system 100, the information handling system 202, and/or the initiator computing module 210, and with reference to FIGS. 1-2. It is noted that certain operations described in method 300 may be optional or may be rearranged in different embodiments.

The storage device 204 receives a first set of input/output (I/O) operations at a first throughput, at 302. Specifically, the initiator computing module 210 provides, to the storage device 204 at the first throughput, the first set of I/O operations for processing at the storage device 204. The first throughput can be a rate at which the initiator computing module 210 provides the first set of I/O operations (rate of delivery) to the storage device 204.

The storage device 204 processes the first set of I/O operations, at 304. In some examples, the storage device 204 processes a subset of the first set of I/O operations. The storage device 204 can process the I/O operations by retrieving and/or receiving data.

The storage device 204 can determine, in response to processing the first set of I/O operations, whether a resource capability of the storage device 204 is below a threshold, at 306. The resource capability of the storage device 204 can relate to a processing capability and/or processing speed for performing the first set of I/O operations, including data retrieval and processing speed. For example, the resource capability can relate to a data queue and/or I/O operation queue that are filled by the received I/O operations.

In some examples, when the resource capability is related to the I/O operation queue, when a number of availability (open) queue slots of the I/O operation queue is a below a threshold number, the storage device 204 can determine that the resource capability of the storage device 204 is below the threshold. For example, the threshold can be set as a threshold number of available (open) queue slots of the I/O operation queue (e.g., 1, 5, 10, 100).

In some examples, when the resource capability is related to the I/O operation queue, when a number of availability (open) queue slots of the I/O operation queue is a below a threshold percentage, the storage device 204 can determine that the resource capability of the storage device 204 is below the threshold. For example, the threshold can be set as a threshold percentage of available (open) queue slots of the I/O operation queue (e.g., 1%, 5%, 10%).

In some examples, the storage device 204 can determine, in response to processing the first set of I/O operations, that the resource capability of the storage device 204 is below a threshold (at 306), and in response, sets the congestion bit 230 to a first value, at 308. For example, the first value can indicate that the congestion bit 230 is "set." For example, the first value can be "1."

In some examples, the storage device 204 can provide data indicating the value of the congestion bit 230 to the initiator computing module 210. In some examples, the storage device 204 can provide data indicating the value of the congestion bit 230 to the initiator computing module 210 in response to a request from the initiator computing module 210. The storage device 204 can provide data indicating the value of the congestion bit 230 to the initiator computing module 210 automatically, e.g., when the value of the congestion bit 230 is changed. The storage device 204 can provide data indicating the value of the congestion bit 230 to the initiator computing module 210 at predetermined intervals.

The storage device 204 receives a second set of input/output (I/O) operations at a second throughput based on the first value of the congestion bit 230, at 310. Specifically, the initiator computing module 210 provides, to the storage device 204 at the second throughput, the second set of I/O operations for processing at the storage device 204. The second throughput can be a rate at which the initiator computing module 210 provides the second set of I/O operations (rate of delivery) to the storage device 204.

In some examples, prior to providing the second of I/O operations, the initiator computing module 210 identifies the value of the congestion bit 230.

The storage device 204 determines whether the second throughput of the second set of I/O operations is less than the first throughput of the first set of I/O operations, at 312. That is, the storage device 204 determines whether the initiator computing module 210, after setting the congestion bit 230 to the value of 1 (indicating a "congestion" at the storage device 204), reduces the throughput of additional I/O operations sent to the storage device 204. For example, when the resource capability is related to the I/O operation queue, when a number of availability (open) queue slots of the I/O operation queue is a below a threshold, to minimize and/or prevent latency issues at the storage device 204, the storage device 204 indicates such to the initiator computing module 210 such that the initiator computing module 210 reduces the throughput of additional I/O operations sent to the storage device 204. However, in some cases, the initiator computing module 210 is not capable of supporting recognition of the congestion bit 230, or does not support the congestion bit 230; and thus, does not reduce the throughput of the additional I/O operations sent to the storage device 204, described further herein.

In some cases, the storage device 204 determines that the second throughput of the second set of I/O operations is less than the first throughput of the first set of I/O operations (at 312), and in response, processes, at the storage device 204, the second set of I/O operations, at 314. In some examples, the storage device 204 processes a subset of the second set of I/O operations. The storage device 204 can process the I/O operations by retrieving and/or receiving data.

The storage device 204 can determine, in response to processing the second set of I/O operations, whether the resource capability of the storage device 204 is above the threshold, at 316. Similar to that mentioned above with respect to step 306, the resource capability of the storage device 204 can relate to a processing capability and/or processing speed for performing the first set of I/O operations, including data retrieval and processing speed. For example, the resource capability can relate to a data queue and/or I/O operation queue that are filled by the received I/O operations.

In some examples, the storage device 204 can determine, in response to processing the second set of I/O operations, that the resource capability of the storage device 204 is above a threshold (at 316), and in response, setting the congestion bit 230 to a second value, at 318. For example, the second value can indicate that the congestion bit 230 is not "set" or is "unset." For example, the second value can be "0."

In some examples, the storage device 204 can provide data indicating the value of the congestion bit 230 to the initiator computing module 210. In some examples, storage device 204 can provide data indicating the value of the congestion bit 230 to the initiator computing module 210 in response to a request from the initiator computing module 210. The storage device 204 can provide data indicating the value of the congestion bit 230 to the initiator computing module 210 automatically, e.g., when the value of the congestion bit 230 is changed. The storage device 204 can provide data indicating the value of the congestion bit 230 to the initiator computing module 210 at predetermined intervals. The storage device 204 can receive a third set of input/output (I/O) operations at the first throughput, at 302. Specifically, the initiator computing module 210 provides, to the storage device 204 at the first throughput, the third set of I/O operations for processing at the storage device 204. The storage device 204 processes the third set of I/O operations, at 304.

In some examples, the storage device 204 can determine, in response to processing the second set of I/O operations, that the resource capability of the storage device 204 is below the threshold (at 316), and in response, continue processing the second set of I/O operations, at 314.

In some examples, the storage device 204 determines that the second throughput of the second set of I/O operations is substantially the same (or the same) as the first throughput of the first set of I/O operations (at 312), and in response, updates the state of the storage device 304 to a busy state, at 320. Specifically, the storage device 204 determines that the initiator computing module 210, after setting the congestion bit 230 to the value of 1 (indicating a "congestion" at the storage device 204), does not reduce the throughput of the second set of I/O operations sent to the storage device 204. That is, the initiator computing module 210 is not capable of supporting recognition of the congestion bit 230, or does not support the congestion bit 230; and thus, does not reduce the throughput of the additional I/O operations sent to the storage device 204. The busy state of the storage device 204 can indicate a "busy" or "task full set" condition at the storage device 204.

In response to the busy state of the storage device 204, the storage device 204 ceases to receive additional I/O operations from the initiator computing module 210, at 322. That is, the storage device 204 stops reception of additional I/O operations. For example, additional spots of the I/O operation queue are not filled by additional I/O operations. Further, the storage device 204 continues to process the second set of the I/O operations, at 324.

The storage device 204 can determine, in response to processing the second set of I/O operations, whether the resource capability of the storage device 204 is above the threshold, at 326. Similar to that mentioned above with respect to step 306 and step 316, the resource capability of the storage device 204 can relate to a processing capability and/or processing speed for performing the first set of I/O operations, including data retrieval and processing speed. For example, the resource capability can relate to a data queue and/or I/O operation queue that are filled by the received I/O operations.

In some examples, the storage device 204 can determine, in response to the resource capability of the storage device 204 being above the threshold (at 326), and in response, setting the congestion bit 230 to the second value, at 328. Further, in response to the resource capability of the storage device 204 being above the threshold, the storage device 204 updates the state of the storage device 204 to a free state, at 330. Specifically, the storage device 204 changes the state of the storage device 204 from the busy state to the free state. The free state of the storage device 204 can indicate that the storage device 204 is available to receive additional I/O operations.

In some examples, the storage device 204 can provide data indicating the value of the congestion bit 230 to the initiator computing module 210. In some examples, the storage device 204 can provide data indicating the value of the congestion bit 230 to the initiator computing module 210 in response to a request from the initiator computing module 210. The storage device 204 can provide data indicating the value of the congestion bit 230 to the initiator computing module 210 automatically, e.g., when the value of the congestion bit 230 is changed. The storage device 204 can provide data indicating the value of the congestion bit 230 to the initiator computing module 210 at predetermined intervals.

The storage device 204 can receive a third set of input/output (I/O) operations at the first throughput based on the second value of the congestion bit 230 and the open state of the storage device 204, at 302. Specifically, the initiator computing module 210 provides, to the storage device 204 at the first throughput, the third set of I/O operations for processing at the storage device 204. That is, after the congestion bit 230 is set to the second value (indicating the congestion bit 230 is unset) and the storage device is in an open state (indicating that the storage device 204 is available to receive additional I/O operations), the initiator computing module 210 is able to provide the third set of I/O operations for processing at the storage device 204. The storage device 204 processes the third set of I/O operations, at 304.

In some examples, the storage device 204 can determine, in response to the resource capability of the storage device 204 being below the threshold (at 316), and in response, continue processing the second set of I/O operations, at 324.

In some examples, the storage device 204 can determine, in response to processing the first set of I/O operations, that the resource capability of the storage device 204 is above the threshold (at 306), and in response, continue processing the first set of I/O operations, at 304.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing input/output (I/O) operations at a storage device, the method comprising:
   receiving, at storage device, a first set of input/output (I/O) operations at a first throughput;
   processing, at the storage device, the first set of I/O operations;
   determining, in response to processing the first set of I/O operations, that a resource capability of the storage device is below a threshold;

setting, in response to determining that the resource capability of the storage device is below the threshold, a congestion bit associated with the storage device to a first value;

receiving, at the storage device, a second set of I/O operations at a second throughput based on the first value of the congestion bit;

in response to receiving the second set of I/O operations:
  determining that when the second throughput of the second set of I/O operations is less than the first throughput of the first set of I/O operations, processing, at the storage device, the second set of I/O operations;
  determining that when the second throughput of the second set of I/O operations is the same as the first throughput of the first set of I/O operations based on the congestion bit not being supported and/or not being recognized, updating a state of the storage device to a busy state;
  in response to the busy state of the storage device:
    ceasing to receive additional I/O operations; and
    continue processing the second set of I/O operations.

2. The computer-implemented method of claim 1, further comprising:
  determining, in response to processing the second set of I/O operations, that the resource capability of the storage device is above the threshold; and
  setting, in response to determining that the resource capability of the storage device is above the threshold, the congestion bit associated with the storage device to a second value.

3. The computer-implemented method of claim 2, further comprising:
  receiving a third set of I/O operations at the first throughput based on the second value of the congestion bit; and
  processing, at the storage device, the third set of I/O operations.

4. The computer-implemented method of claim 3, wherein the first value of the congestion bit indicates the congestion bit is set, and the second value of the congestion bit indicates the congestion bit is unset.

5. The computer-implemented method of claim 1, further comprising:
  determining, in response to processing the second set of I/O operations, that the resource capability of the storage device is below the threshold; and
  processing, in response to determining that the resource capability of the storage device is below the threshold, the second set of I/O operations.

6. The computer-implemented method of claim 1, further comprising:
  determining, in response to processing the second set of I/O operations, that the resource capability of the storage device is above the threshold;
  in response to determining that the resource capability of the storage device is above the threshold:
  setting the congestion bit associated with the storage device to a second value;
  updating the state of the storage device from the busy state to an open state; and
  receiving a third set of I/O operations at the first throughput based on the second value of the congestion bit and the open state of the storage device.

7. The computer-implemented method of claim 1, further comprising:
  determining, in response to processing the first set of I/O operations, that the resource capability of the storage device is below the threshold;
  in response to determining that the resource capability of the storage device is below the threshold:
  continue processing the second set of I/O operations.

8. The computer-implemented method of claim 1, further comprising:
  determining, in response to processing the first set of I/O operations, that a resource capability of the storage device is above a threshold; and
  continue processing, in response to determining that the resource capability of the storage device is above the threshold, the first set of I/O operations.

9. An information handling system comprising a processor having access to memory media storing instructions executable by the processor to perform operations, comprising:
  receiving, at storage device, a first set of input/output (I/O) operations at a first throughput;
  processing, at the storage device, the first set of I/O operations;
  determining, in response to processing the first set of I/O operations, that a resource capability of the storage device is below a threshold;
  setting, in response to determining that the resource capability of the storage device is below the threshold, a congestion bit associated with the storage device to a first value;
  receiving, at the storage device, a second set of I/O operations at a second throughput based on the first value of the congestion bit;
  in response to receiving the second set of I/O operations:
  determining that when the second throughput of the second set of I/O operations is less than the first throughput of the first set of I/O operations, processing, at the storage device, the second set of I/O operations;
  determining that when the second throughput of the second set of I/O operations is the same as the first throughput of the first set of I/O operations based on the congestion bit not being supported and/or not being recognized, updating a state of the storage device to a busy state;
  in response to the busy state of the storage device:
    ceasing to receive additional I/O operations; and
    continue processing the second set of I/O operations.

10. The information handling system of claim 9, the operations further comprising:
  determining, in response to processing the second set of I/O operations, that the resource capability of the storage device is above the threshold; and
  setting, in response to determining that the resource capability of the storage device is above the threshold, the congestion bit associated with the storage device to a second value.

11. The information handling system of claim 10, the operations further comprising:
  receiving a third set of I/O operations at the first throughput based on the second value of the congestion bit; and
  processing, at the storage device, the third set of I/O operations.

12. The information handling system of claim 11, wherein the first value of the congestion bit indicates the congestion bit is set, and the second value of the congestion bit indicates the congestion bit is unset.

13. The information handling system of claim 9, the operations further comprising:

determining, in response to processing the second set of I/O operations, that the resource capability of the storage device is below the threshold; and processing, in response to determining that the resource capability of the storage device is below the threshold, the second set of I/O operations.

14. The information handling system of claim 9, the operations further comprising:

determining, in response to processing the second set of I/O operations, that the resource capability of the storage device is above the threshold;

in response to determining that the resource capability of the storage device is above the threshold:

setting the congestion bit associated with the storage device to a second value;

updating the state of the storage device from the busy state to an open state; and receiving a third set of I/O operations at the first throughput based on the second value of the congestion bit and the open state of the storage device.

15. The information handling system of claim 9, the operations further comprising:

determining, in response to processing the first set of I/O operations, that the resource capability of the storage device is below the threshold;

in response to determining that the resource capability of the storage device is below the threshold:

continue processing the second set of I/O operations.

16. The information handling system of claim 9, the operations further comprising:

determining, in response to processing the first set of I/O operations, that a resource capability of the storage device is above a threshold; and continue processing, in response to determining that the resource capability of the storage device is above the threshold, the first set of I/O operations.

17. A non-transitory computer-readable medium storing software comprising instructions executable by one or more computers which, upon such execution, cause the one or more computers to perform operations comprising:

receiving, at storage device, a first set of input/output (I/O) operations at a first throughput;

processing, at the storage device, the first set of I/O operations;

determining, in response to processing the first set of I/O operations, that a resource capability of the storage device is below a threshold;

setting, in response to determining that the resource capability of the storage device is below the threshold, a congestion bit associated with the storage device to a first value;

receiving, at the storage device, a second set of I/O operations at a second throughput based on the first value of the congestion bit;

in response to receiving the second set of I/O operations:
    determining that when the second throughput of the second set of I/O operations is less than the first throughput of the first set of I/O operations, processing, at the storage device, the second set of I/O operations;
    determining that when the second throughput of the second set of I/O operations is the same as the first throughput of the first set of I/O operations based on the congestion bit not being supported and/or not being recognized, updating a state of the storage device to a busy state;
    in response to the busy state of the storage device:
        ceasing to receive additional I/O operations; and
        continue processing the second set of I/O operations.

18. The non-transitory computer-readable medium of claim 17, the operations further comprising:

determining, in response to processing the second set of I/O operations, that the resource capability of the storage device is above the threshold; and setting, in response to determining that the resource capability of the storage device is above the threshold, the congestion bit associated with the storage device to a second value.

* * * * *